United States Patent [19]

Herrington

[11] 4,392,897
[45] Jul. 12, 1983

[54] MANUFACTURING PROCESS FOR CHANNEL SEAL

[75] Inventor: Fox J. Herrington, Holcomb, N.Y.

[73] Assignee: Mobil Oil Corporation, New York, N.Y.

[21] Appl. No.: 365,814

[22] Filed: Apr. 5, 1982

[51] Int. Cl.³ .................... B29C 24/00; B65D 33/24
[52] U.S. Cl. ................................ 156/66; 24/201 C;
24/201 R; 150/3; 156/164; 156/204;
156/244.25; 156/459; 156/465; 156/499;
156/500; 156/578; 229/48 SB; 229/48 T;
229/62; 264/177 R; 264/259; 425/104;
425/105; 425/111; 425/113; 428/35; 428/358
[58] Field of Search ............. 24/201 C, 201 R; 150/3,
150/7; 156/66, 204, 244.11, 244.25, 164, 459,
465, 499, 500, 501, 578; 229/48 SB, 48 T, 62;
264/177 R, 259; 425/104, 105, 111, 113;
428/35, 358

[56] References Cited

U.S. PATENT DOCUMENTS

| | | | |
|---|---|---|---|
| Re. 28,969 | 9/1976 | Naito | 150/3 |
| 2,899,347 | 8/1959 | Kindseth | 229/62 X |
| 3,060,985 | 10/1962 | Vance et al. | 150/3 |
| 3,154,239 | 10/1964 | Madsen | 229/62 |
| 3,217,934 | 11/1965 | Schneider et al. | 229/62 X |
| 3,256,941 | 6/1966 | Rivman | 229/62 |
| 3,339,606 | 9/1967 | Kugler | 150/3 |
| 3,942,713 | 3/1976 | Olson et al. | 229/62 |
| 3,990,627 | 11/1976 | Olson | 229/62 |
| 4,186,786 | 2/1980 | Kirkpatrick | 150/3 |
| 4,354,541 | 10/1982 | Tilman | 150/3 |

*Primary Examiner*—Robert A. Dawson
*Attorney, Agent, or Firm*—C. A. Huggett; M. G. Gilman; J. F. Powers, Jr.

[57] ABSTRACT

Molten thermoplastic, such as polyethylene, and a hot melt adhesive are coextruded through a channel shaped profile die. While still molten, the channel shaped strip, having adhesive between the ribs thereof, is brought into contact with a moving web of a thermoplastic, e.g. polyethylene film, which is backed up by a roll at a controlled temperature. The temperature differential between the roll and the molten thermoplastic is maintained so that the thermoplastic adheres to the moving web upon contact and thereafter cools to set the thermoplastic in the channel shaped profile. The web is under tension so that contraction of the film upon release compensates for the contraction of the channel shaped strip as it cools.

32 Claims, 17 Drawing Figures

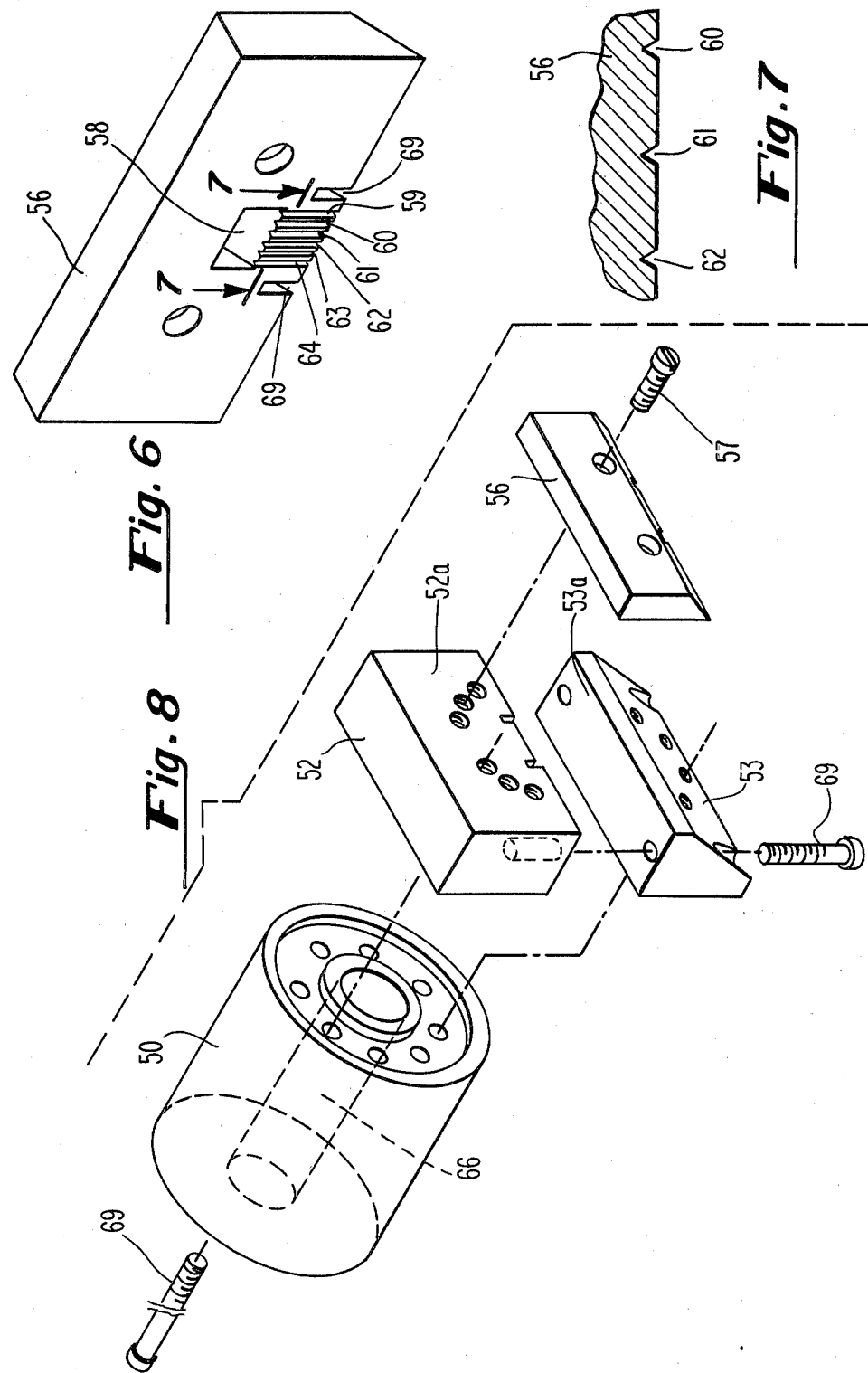

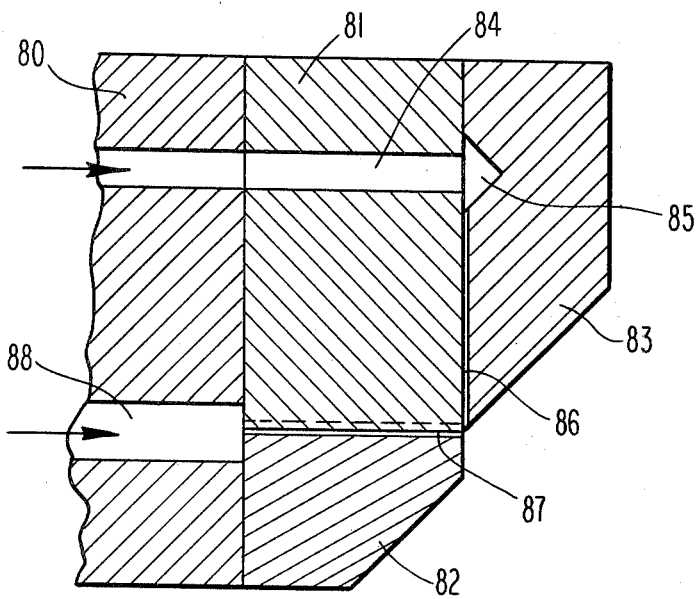
*Fig. 9B*
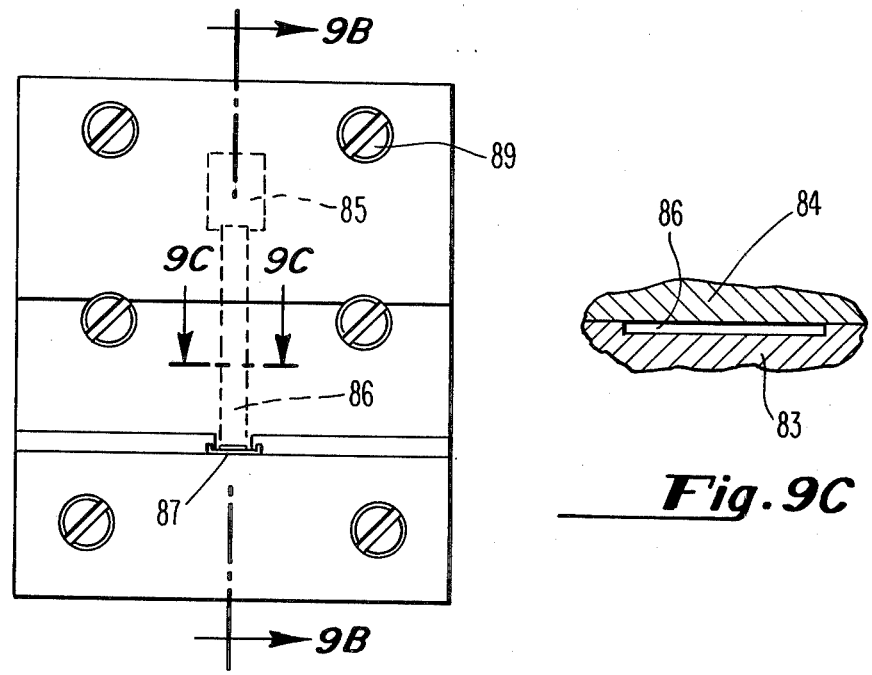
*Fig. 9C*
*Fig. 9A*

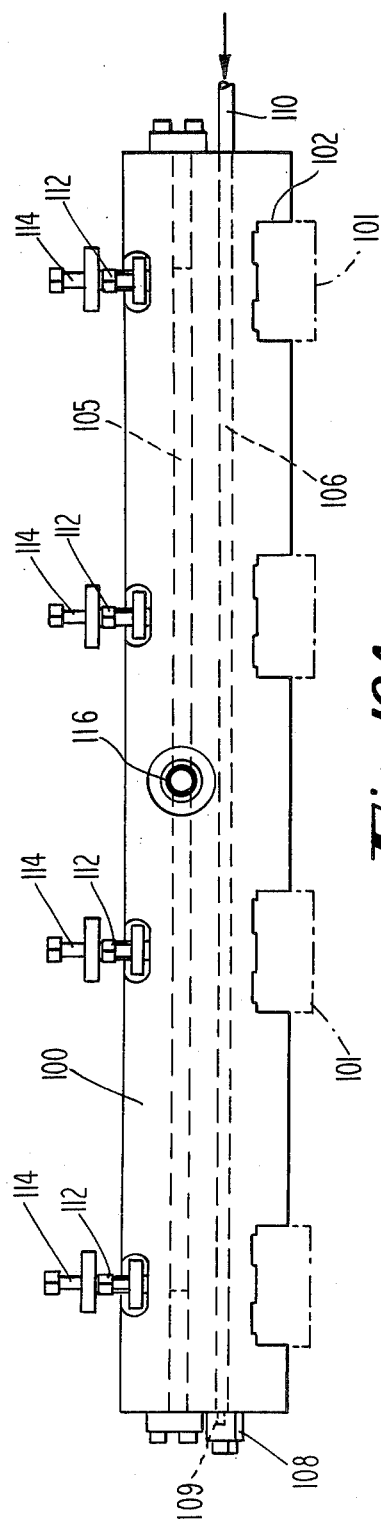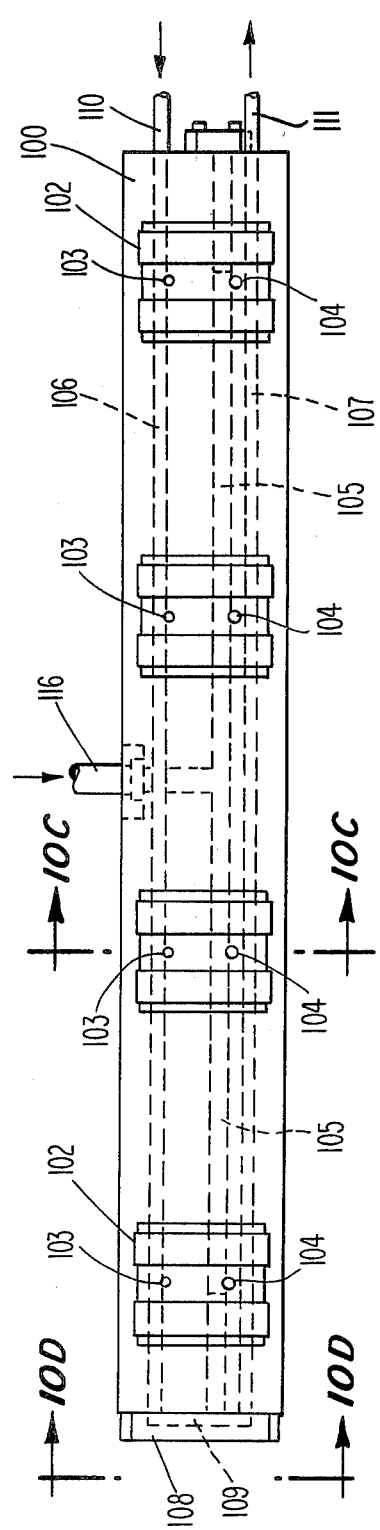

MANUFACTURING PROCESS FOR CHANNEL SEAL

BACKGROUND OF THE INVENTION

1. Field of the Invention

This invention relates to apparatus for and a method of applying a channel shaped adhesive strip having ribs along each side and an adhesive layer between the ribs to a plastic film. Related applications assigned to the same assignee as this application include the following copending applications: "Adhesive Channel Closure for Flexible Bags", Ser. No. 335,798 filed Dec. 30, 1981; "Laminated Pressure Sensitive Adhesive Systems for Use in Plastic Bags", Ser. No. 335,799 filed Dec. 30, 1981; "Protective Strip for Z-Fold Bag Closure", Ser. No. 335,955 filed Dec. 30, 1981 "Adhesive Bag Closure That Opens Easily By Hand But Resists Opening By Contents", Ser. No. 335,800 filed Dec. 30, 1981; and "Splayed Roll Folder for Adhesive Application", Ser. No. 297,523 filed Aug. 28, 1981, the last three applications being incorporated by reference herein.

2. Brief Description of the Prior Art

Numerous closure arrangements have been proposed and employed for securing plastic bags in a closed condition. Such devices include rubber bands, twist ties, paper or plastic coated lengths of wire which are fastened around the gathered and twisted neck of a plastic bag to secure a closed position. Such devices do not form an integral part of a bag structure, and hence may not be readily accessible when it is desired to effect closure of the bag.

A variety of closures for flexible bags have been developed including the so-called profile closure having at least one pair of mating channels, an example of which may be seen in U.S. Pat. No. Re. 28,969 to Naito which shows the Zip-loc storage bag. U.S. Pat. No. 4,186,786 to Kirkpatrick shows colored channels so that the user may more easily detect complete occlusion of profile bag openings. Difficulties have been experienced by the user in closing these profile types of closures because it is difficult and/or inconvenient to obtain good registration of the two parts of the lock.

The use of pressure sensitive adhesives to close plastic bags is an expedient which is readily accessible and not subject to severe registration problems. Typically, bags are packaged within a dispensing carton in either continuous roll form or individually adjacent to one another. When an exposed and unprotected adhesive strip adjacent the mouth of such bag structures has been employed, the bags had a tendency to stick to one another as to exterior objects, following dispensing of individual bags from the container, thus making it difficult to use the bags. Also, the adhesives employed were necessarily non-aggressive in an attempt to alleviate the bag-sticking problem, but this made the closures insecure.

Bag sticking during storage was solved by the arrangement shown in U.S. Pat. No. 3,990,627 to Olsen (and assigned to the same assignee as this application), in which a Z-fold in the bag protects the adhesive strip during shipment and storage. When the bag is to be used, the Z-fold is pulled out to expose the adhesive. This arrangement has been successfully used, but the release of the adhesive strip from its Z-fold protection is not as easy as may be desired.

A method of making a bag closure comprising perforations may be seen in U.S. Pat. No. 2,899,347 to Kindseth.

Thus, it is an object of the present invention to provide a bag closure by coextruding a channel shaped strip of thermoplastic with a layer of pressure sensitive adhesive between the ribs thereof onto a moving web of plastic film which may be formed into plastic bags.

It is another object of the present invention to maintain a temperature differential between the molten thermoplastic and the moving web so that the molten thermoplastic adheres to the moving web upon contact and thereafter cools to prevent puckering of the moving web.

It is a further object of the present invention to provide an apparatus and a method which quickly and economically applies a channel shaped thermoplastic strip to a polymer film without distortion of the channel or the film, and which also applies a substantially uniform adhesive layer between the ribs of the channel.

These and other objects of the invention will be apparent from the following description.

SUMMARY OF THE INVENTION

The present invention relates to apparatus for and a method of making plastic bags having a channel shaped strip with adhesive between the ribs. The ribs along each side of the adhesive layer hold the adhesive strip away from the adjacent layer of plastic film during shipment and storage of the bags. When the bag is to be used, the film is pressed down into contact with the pressure sensitive adhesive, thereby providing a good seal for the bag.

In accordance with the present invention a coextruding assembly comprising a feed block and a shaping portion is positioned adjacent to a moving web of film. Molten thermoplastic, e.g., comprising polyethylene, is supplied to a channel profile extrusion die in the shaping portion which extrudes a channel shaped strip of thermoplastic onto the moving web. A dispenser applies a layer of adhesive across the width of the strip between the ribs. The molten thermoplastic is heated to a temperature which is lower than that which sould otherwise be required to obtain good adhesion between thermoplastic channel and the moving film, because the moving film is heated by a backup roller. The temperature differential between the molten thermoplastic and moving web is such that the molten thermoplastic adheres to the moving web upon contact and thereafter cools to set it in the desired channel profile.

The moving web of film is maintained under tension as it moves past the coextruder so that contraction of the film, upon release, compensates for the contraction of the channel shaped strip as it cools. This prevents puckering of the web of film.

In accordance with another aspect of the present invention, adhesive under pressure is applied across the width of the strip, preferably as a substantially uniform and continuous layer. In one embodiment this is accomplished by a plurality of V-shaped notches which extend from an adhesive reservoir to openings adjacent to the extruded channel. These V-shaped notches provide the desired pressure drop between the reservoir and the external openings of the notches and they are easier to fabricate than a single narrow slot which would accomplish this purpose. Alternatively, a slit may be used instead of the V-shaped notches if properly shaped to achieve sufficient pressure drop or if a spreader overlying the trough of the channel is used to spread out the glue, preferably into a substantially continuous layer within the channel strip.

In accordance with another aspect of the present invention, the dimensions of the die opening are larger than the final desired dimensions of the channel shaped adhesive strip to be formed. The web of film moves at a speed greater than the speed of extrusion so that the channel shaped strip is drawn to its desired dimensions. The large die opening has the advantage of easier fabrication and servicing.

In accordance with another aspect of the present invention the coextruding assembly comprises a unitary four block construction which supplies thermoplastic to the shaping portion which shapes the general channel structure through a die opening, and applies adhesive to the width of the strip between the ribs. This four piece construction has important advantages of ease of construction and servicing.

BRIEF DESCRIPTION OF THE DRAWINGS

FIG. 6 is an enlarged view of the adhesive shaping block;

FIG. 7 is a sectional view along line 7—7 in FIG. 6;

FIG. 8 is an exploded view of a coextruding assembly constructed in accordance with this invention;

FIG. 9A is a front plan view of an alternate embodiment of a shaping block constructed in accordance with this invention;

FIG. 9B is a sectional line along line 9B—9B in FIG. 9A;

FIG. 9C is an enlarged sectional view of the glue channel of FIG. 9B;

FIG. 10A is a top sectional view of the manifold unit;

FIG. 10B is a front view of the manifold unit;

DETAILED DESCRIPTION OF THE DRAWINGS

Figure 1A:
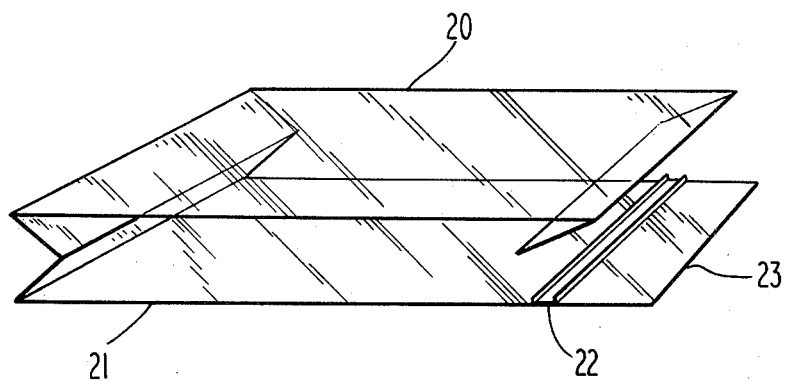
FIG. 1A is a perspective of a partially constructed bag having a channel member produced by the apparatus and method of this invention.
Figure 1B:
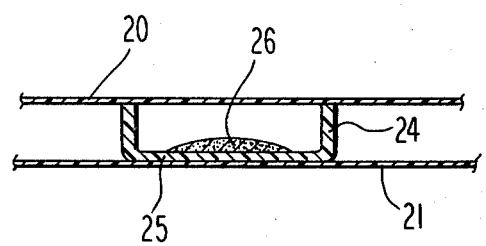
FIG. 1B is an enlarged cross section of a channel closure produced according to this invention in a stored position.
Figure 1C:
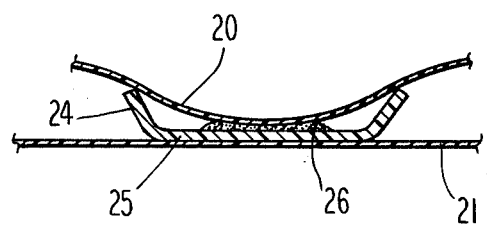
FIG. 1C is the embodiment shown in FIG. 1B in a sealed position.

The apparatus of this invention is particularly useful in forming bag closures comprising a channel shaped strip having adhesive such as a pressure sensitive adhesive in the trough of the strip. FIG. 1A shows a partially constructed bag having a first wall 20 and a second wall 21. A closure comprising a channel shaped adhesive strip 22 is affixed on second wall 21 a preselected distance from edge 23. As shown more clearly in FIG. 1B, channel strip 22 comprises ribs 24 and a base 25. The trough formed by ribs 24 and base 25 contains an adhesive layer 26 therein, the thickness of which should not exceed the interior height of ribs 24. Preferably layer 26 is substantially continuous. During shipment and storage, ribs 24 protect adhesive layer 26. FIG. 1C shows the closure in a sealed position in which a substantially flat portion of first wall 20, e.g., an interior flap, has been pressed into contact with adhesive layer 26. Ribs 24 have been slightly deformed to allow more intimate contact between wall 20 and adhesive layer 26.

Figure 3:
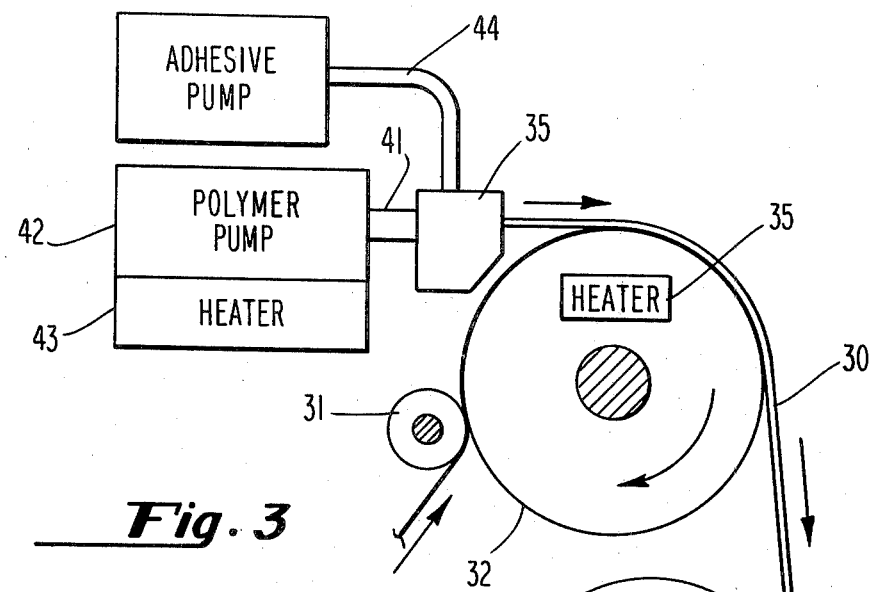
FIG. 3 is a diagrammatic cross section of the apparatus of this invention.
Figure 2:
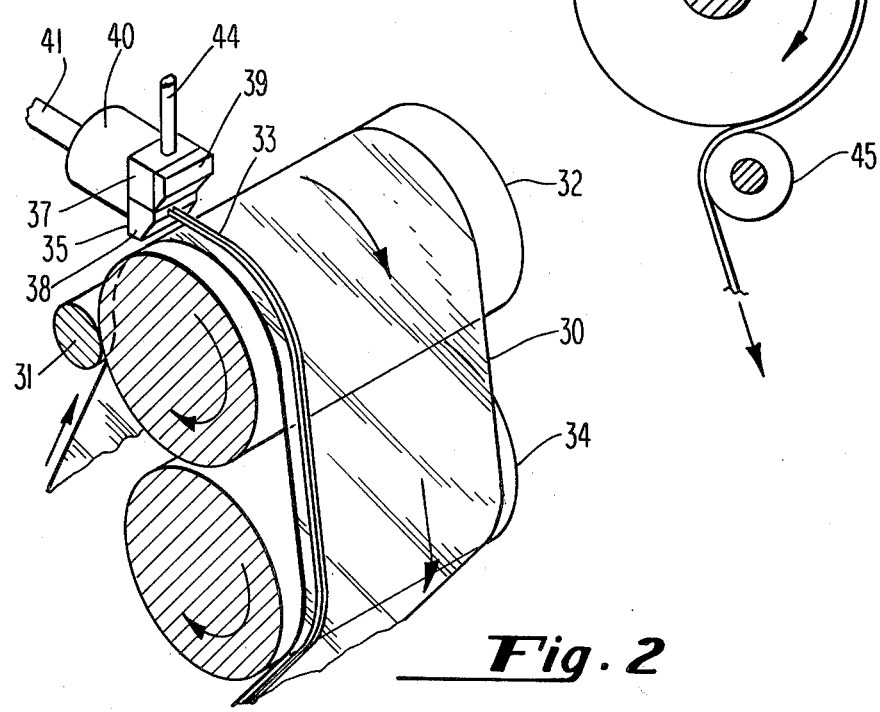
FIG. 2 is a perspective of a coextruding assembly of this invention during a production run.

An apparatus for making these bags is shown in FIGS. 2 and 3 which depict a continuous web of a thermoplastic film 30, e.g., polyethylene, moving between first nip roll 31 and a backup roller 32. Film 30 passes over back up roller 32 during which it is contacted by a channel shaped strip 33 containing a pressure sensitive adhesive. The film then passes over a second or composite roller 34 and on to either storage or further processing, e.g., heat sealing of the bag sides. A coextruding assembly is positioned adjacent to backup roller 32 and moving web 30 to apply the channel shaped adhesive strip to the moving web 30 on the side of the film opposite first or backup roller 32. The coextruding assembly comprises feed block 40, and a shaping portion comprising a channel profile extrusion die block 37 which fits against a flat block 38 to shape the channel structure. The shaping portion further comprises adhesive dispensing block 39 which fits against channel die block 37 to apply a layer of adhesive across the width of the channel strip 33 between the ribs thereof. Channel die block 37 is connected to the feed block 40 which is fed through pipe 41 by a source of molten thermoplastic, shown in FIG. 3 as a polymer extruder 42 ( ) with a heater 43. Adhesive dispensing block 39 is fed through channel die block 37 by a hose 44 connected to a source of molten adhesive (for example, hot melt adhesive supplied by using a Nordson model HMX11-A).

FIG. 3 shows a preferred embodiment in which a heater 35 is used to maintain backup roller 32 at a desired temperature. This maintains a temperature differential between the molten thermoplastic and the moving web of film. To make the channel adhere to the film, it is necessary to have a sufficiently high temperature where they join together. This is achieved by the proper combination of molten thermoplastic temperature and backup roller temperature. The backup roller must be sufficiently cool to prevent distortion of the film where it contacts the hot channel. However, it has been found that when the backup roller 32 is maintained at a warmer temperature, the required molten thermoplastic temperature is lower. A satisfactory operation has been achieved with a molten polyethylene temperature of 300° F. and a backup roller temperature of 140° F. at a film speed of 32 ft. per minute. Both the film and the channel comprised low density polyethylene.

In order to maintain the moving web of film 30 under tension when the strip is being applied, first nip roller 31 presses the film 30 against the backup roller 32. A second nip roller 45 presses the moving film against the second roller 34. Alternatively, the second roller 34 may be omitted if the first backup roller 32 is adjusted at a preselected tension to remove any ripples that may occur in the film 30. It is necessary to tension the film at the point where the channel joins it in order to avoid distortion or puckers. If the film tension is low, then in the final product the film is puckered along the channel. This is caused by shrinking of the channel as it cools. Applying tension to the film stretches it elastically, so that when it is released it contracts. If the amount of tension is proper, the contraction will be the same as the shrinking of the channel and the product will be smooth. If there is too much tension, then the film will try to contract more than the channel shrinks, and the channel will be rippled in large bends.

Figure 5:
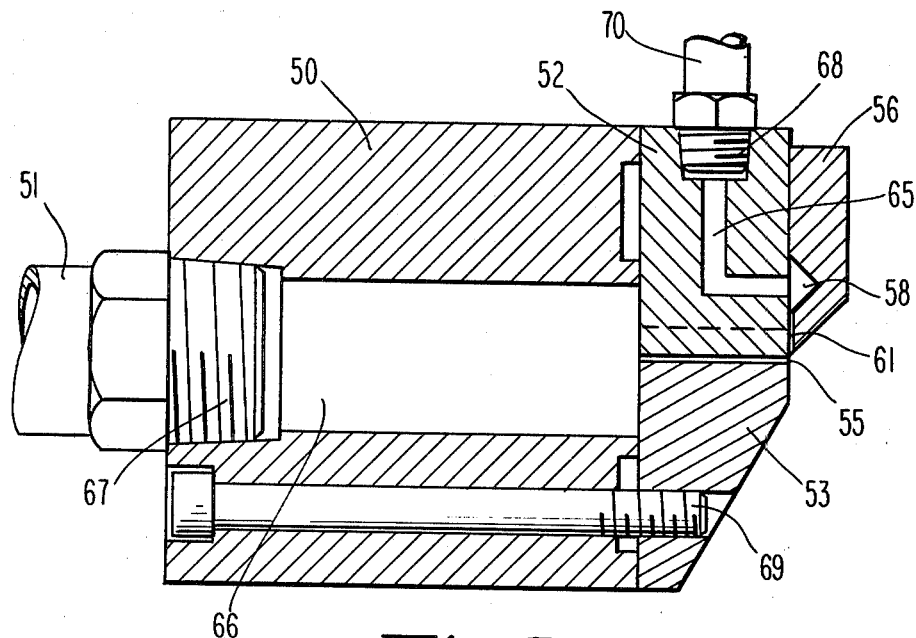
FIG. 5 is a sectional view along offset line 5—5 in FIG. 4.
Figure 4:
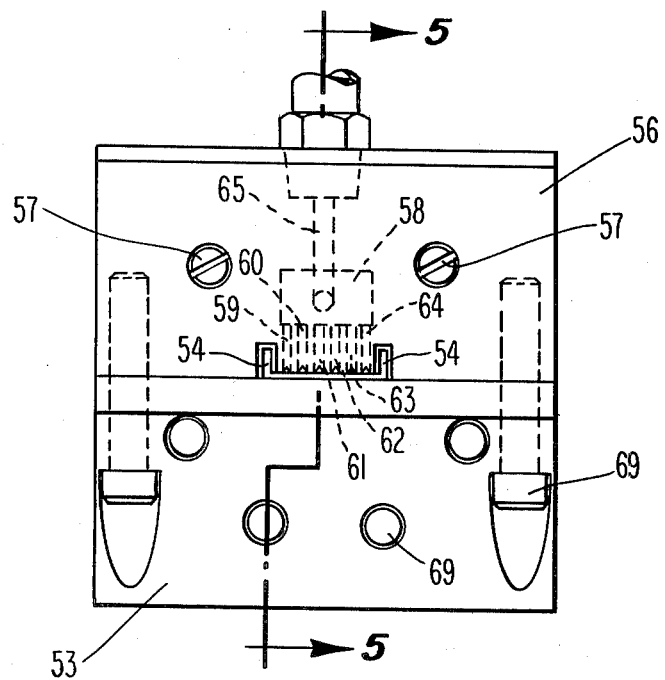
FIG. 4 is a front plan view of a coextruding assembly constructed in accordance with this invention.

FIGS. 4 and 5 show a coextruding assembly comprising a feed block 50 and a shaping portion or block comprising channel die block 52, flat block 53 and adhesive shaping block 56. The feed block 50 is connected by a pipe 51 to a source of molten thermoplastic, e.g., polyethylene supplied by a polymer pump. Molten plastic enters feed area 66 and the feed rate for extruding the channel is regulated by means of screw adjust 67. Feed block 50 has positioned thereon and bolted thereto a channel shaping block or channel die block 52 and flat block 53 positioned under channel die block 52. Channel die block 52 has a shaping surface comprising rib forming grooves 54 and a base forming recessed surface 55 cut into its surface. The shaping surface of channel die block 52 is placed against a flat surface of flat block 53 and bolted thereto with bolts 69 to close the open side of the channel profile extrusion die block 52. This two piece construction has important advantages. It is easier to fabricate than a comparable one piece die. Also, it is easier to clean the die because it can be taken apart for thorough cleaning of the grooves. The shaping portion of the coextruding assembly also comprises an adhesive shaping block 56 which is bolted onto the assembly through channel die block 52 with bolts 57. Adhesive shaping block 56 has a cavity therein to form an adhesive reservoir 58. A plurality of V-shaped notches 59-64 extend between the reservoir 58 and the lower edge of the adhesive shaping block 56. Adhesive flows from the reservoir 58 through the V-shaped notches uniformly over the width of the strip and between the ribs. The adhesive shaping block 56 is positioned against a flat surface of channel die block 52 orthoganal to the surface having notches 59-64 and in the direction of the movement of the web. Adhesive from an outside source, e.g., an adhesive pump, is introduced into the coextruding assembly by hose 70 and flows through a passage 65 in channel die block 52 and enters reservoir 58. The rate of feed of adhesive is determined by screw adjust 68. The V-shaped notches 59-64 (shown in more detail in FIG. 7) in adhesive shaping block 56 allow distribution of the adhesive uniformly across the width of the channel and easy control of the flow of adhesive. In a preferred embodiment (explained in more detail in FIGS. 9A-9C), the application of adhesive can be accomplished with a single slot having the same cross-sectional area as the plurality of triangular notches but such a single slot must be extremely shallow to effect the pressure drop needed and requires higher precision in the matching of the adhesive shaping block. The use of a single slot allows more even and more uniform distribution of adhesive. A third embodiment may be used which combines the V-shaped notches and the single slot in a serial construction with the slot positioned under the notches and closest to the opening. Thus the adhesive would flow through the notches (allowing for optimum control of the flow of the adhesive) and then into a slot and into the channel (allowing for optimum evenness and uniformity in distribution).

FIGS. 6 and 7 show more detail for the adhesive shaping block of FIGS. 4 and 5. Adhesive shaping block 56 additionally has machined therein channels 69 to allow the ribs of the extruded channel structure to pass therethrough.

FIG. 8 shows an exploded view of an embodiment of the coextruding assembly as it would appear in its component parts. The assembly comprises feed block 50 with channel die block 52 and flat block 53 positioned therein. Adhesive shaping block 56 fits over the front of channel die block 52. In an assembled position flat surface 53a is positioned under channel die block 52 to form a channel shaped opening through which molten thermoplastic material is extruded to form a channel strip. Similarly a substantially flat surface 52a of channel die block 52 is positioned against adhesive shaping block 56 to complete the formation of the notched slots and reservoir machined therein.

In operation, a molten thermoplastic, e.g., polyethylene, a copolymer or terpolymer thereof, is fed from a polymer pump into a feed area 66 at a rate determined by screw adjust member 67. A channel strip is formed by extruding the molten plastic through the shape formed by channel die block 52 and flat block 53. At the point where front surface 52a of channel die block 52 is contacted by adhesive shaping block 56 a layer of molten adhesive is deposited between the ribs of the extruded channel structure. The adhesive is applied by means of a shaped groove or plurality of grooves through which adhesive flows from a reservoir 58. Reservoir 58 is fed with adhesive through a passage 65 in channel die block 52 which connects the reservoir 58 with an adhesive pump.

It has been found that the size of the channel profile extrusion die opening can be different, e.g. larger, than the size of the channel deposited onto the film. The difference can be corrected by adjusting the linear speed of the film relative to the output of the die. Running the film faster will draw down the molten channel more, making it smaller in cross-section but having essentially the same proportions. It has been found that a smaller die opening gives a channel that is more precisely defined, but a larger die opening is easier to fabricate and service. The size ratio (as measured by width or height) of the die to the final channel may be varied according to the type of resin used, the running speed and the temperatures used. When polyethylene is used to form the channel it is preferred that the opening in the channel profile extrusion die be about two to about four times the dimension of the channel shaped strip containing the adhesive. More particularly, a satisfactory operation was achieved with a die that had an opening twice the dimensions of the final channel. That is, for a channel 0.200 inches wide, the die was 0.400 inches wide. It was found that if the die opening was too large there was difficulty in making the ribs stand up straight. When the channel wraps around the backup roller 32, the vertical ribs tend to flop over. With a smaller die, this problem was less severe because the molten channel cooled before the distorting effect of the roll was present. Another possible cause of problems with larger die openings relates to the area of reduction during draw-down. With a greater reduction in width as is present with the larger die, the web of the channel contracts more, pulling along with it the portions of the ribs that adjoin the web. But the exposed portions of the ribs have no force causing them to move inwardly, so they go straight. The result is an apparent outward flopping of the ribs.

FIGS. 9A-9C show an alternate embodiment for the coextruding assembly. Feed block 80 has positioned thereon a channel die block 81 and flat block 82. In front of a flat portion of channel die block 81 is adhesive shaping block 83 in which has been formed a single narrow groove 86 and a cavity or reservoir 85. Molten thermoplastic is introduced into passage 88 through feed block 80 and extruded through channel shaped die form 87 is previously explained. Molten adhesive is introduced into passage 84 which passes through feed block 80 and channel die block 81 to supply adhesive to reservoir 85. Glue flows from reservoir 85 through groove or slit 86 and onto the extruded channel strip as the channel leaves the extruding die form 87. Bolts 89 are used to join components of the shaping portion of the coextruding assembly to each other and to the feed block 80.

Figure 10C:
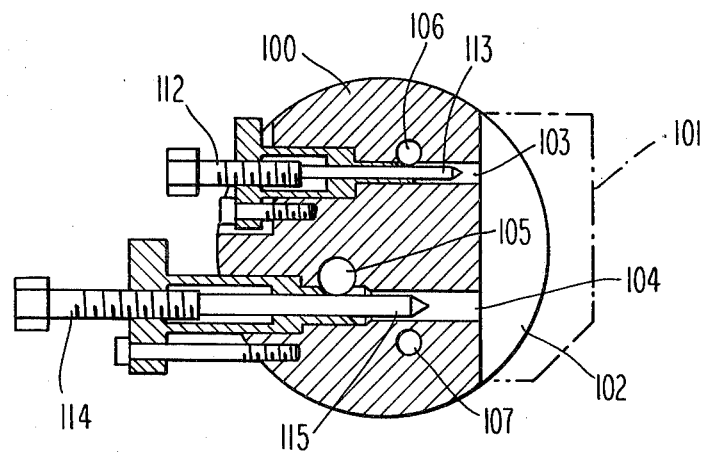
FIG. 10C is a sectional view along line 10C—10C of FIG. 10B.
Figure 10D:
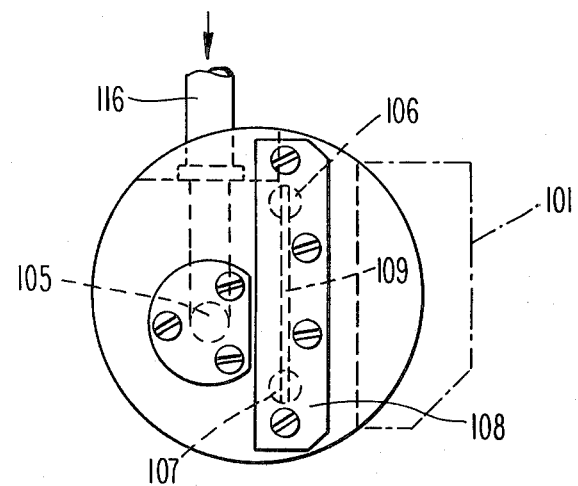
FIG. 10D is a sectional view along line 10D—10D of FIG. 10B.

FIGS. 10A–10D show an alternate embodiment of the invention preferred for more efficient production having a coextruding manifold assembly comprising a manifold unit 100 and four shaping portions or blocks (the position of one of such shaping blocks 101 being shown in phantom in FIG. 10A). Manifold unit 100 is a cylindrical shaped structure having channeled recesses 102 formed therein for receiving shaping portions or blocks 101. The shapes and areas of the channeled recesses 102 have been selected to ensure intimate contact between manifold unit 100 and shaping portions 101 and minimize the effects of pressures from the adhesive and thermoplastic as they exit the manifold unit 100 at adhesive ports 103 and thermoplastic ports 104 and enter shaping portions 101. Manifold unit 100 also has formed therein a bore 105 for thermoplastic to flow through the manifold unit 100 and to each individual shaping block 101. Thermoplastic is pumped into the manifold unit through a hose 116 into bore 105 through which it flows to each plastic port 104 and then into a shaping portion 101. At each end of the bore 105 in manifold unit 100, there is a blockage (e.g., a plate, a plug or an area where the bore is not formed to the outside of the manifold unit), so that the only exit for the thermoplastic is through the shaping blocks 101. Manifold unit 100 also comprises an adhesive or glue feed bore 106 which passes through a substantial length of the unit and supplies glue to each shaping block 101 through adhesive ports 103. After the flow of adhesive or glue has passed through feed bore 106 it is channeled into a return bore 107 to be recycled by the adhesive pump into the system. In the embodiment shown in FIGS. 10A–10D, the channeling is accomplished by positioning a block 108 having a groove 109 formed therein and of sufficient dimension so as to provide a path from the termination of feed bore 106 to the beginning of return bore 107. This groove also serves the need for creating back pressure in the adhesive system. (Alternatively valves could be used to create such back pressure.) Thus, adhesive enters the system through hose 110, flows through feed bore 106 (with portions of the adhesive exiting through adhesive ports 103 and into shaping portion 101), groove 109, return bore 107 and exits through hose 111, and may then be recirculated into the manifold assembly. In an alternate embodiment, the groove between the end of glue feed bore 106 and the start of glue return bore 107 could be formed in the end of the manifold unit 100 and a flat plate bolted onto the end to complete the channeling of the glue. Screw adjust 112 with needle valve 113 is used to adjust the pressure and feed rate of the glue as it enters shaping block 101. Similarly screw adjust 114 with needle valve 115 is used to adjust the pressure and feed rate of the thermoplastic as it enters the shaping block 101. Since the glue is flowing through a recycling system, individual adjustments of pressure and feed rate may be made for each shaping block 101 without substantial effect on the other shaping units. Since the thermoplastic material is not in a recycled system there is more effect on the pressure to the other shaping blocks when an adjustment is made to one of them. As will be appreciated by those skilled in the art of thermoplastic polymers and their properties including their non-Newtonian behavior (i.e., viscosity is not constant at a given temperature and change in shear stress is not proportional to change in shear rate), more care must be taken in selecting and regulating the feed pressures and flow rates of the thermoplastic used.

Where it is desired to produce plastic bags in which the channel shaped adhesive strip is protected by a Z-fold, the apparatus of the present invention may be incorporated with the apparatus described in co-pending application Ser. No. 297,523, filed Aug. 28, 1981, Herrington, "Splayed Rolled Folder For Adhesive Application". The correspondence between the rollers in this application and the rolls shown in FIG. 1 of that application are as follows. The nip roller 43 corresponds with nip roller 11; backup roller 32 corresponds with strip roller 20; second roller 34 corresponds with composite roll 30; and nip roller 45 corresponds with nip roller 41. With this correspondence between the rolls, it can be seen how the apparatus of the present invention can be used to apply a channel shaped strip which is enclosed within the Z-fold formed by the composite roll 30 in my previous application.

While a particular embodiment of the invention has been shown and described, various modifications are within the true spirit and scope of the invention. The appended claims are, therefore, intended to cover all such modifications.

What is claimed is:

1. Apparatus for attaching a channel shaped strip containing adhesive to a plastic film, said strip having ribs along each side, said adhesive being between said ribs and having a thickness less than the interior height of said ribs, comprising:
   means for moving a web of said film;
   a coextruding assembly positioned adjacent to said moving die comprising:
      means for extruding a channel shaped strip;
      means for applying a layer of adhesive into said channel strip between the ribs thereof;
      means for supplying molten thermoplastic to said coextruding assembly;
      means for supplying molten adhesive to said adhesive applicator; and
      means for maintaining a temperature differential between said extruded channel strip and said moving web as said extruded channel is applied to said moving web so that said extruded channel adheres to said moving web upon contact and thereafter cools to set said thermoplastic in said channel shaped strip having pressure sensitive adhesive between said ribs.

2. The apparatus recited in claim 1 wherein said means for moving a web of said film includes a backup roller, said coextruding assembly being positioned adjacent to said backup roller to apply said channel shaped adhesive strip to said moving web on the side thereof opposite from said backup roller.

3. The apparatus recited in claim 1 wherein said means for maintaining a temperature differential comprises;
- a first heater for said backup roller for maintaining said moving web at a first temperature;
- a second heater for said means for supplying said molten thermoplastic to said coextruding assembly at a second temperature; and
- means for maintaining said second temperature of said molten thermoplastic higher than said first temperature of said moving web of film as the extruded channel is applied to said moving web.

4. The apparatus recited in claim 1 further comprising:
- means for maintaining said moving web of film under tension so that contraction of the film upon release, compensates for the contraction of said channel shaped strip as it cools to prevent puckering of said moving web.

5. The apparatus recited in claim 1 wherein said adhesive applicator includes a reservoir for said adhesive; and
- means for supplying adhesive under pressure from said reservoir across the width of said strip.

6. The apparatus recited in claim 5 wherein a plurality of V-shaped notches extend from said reservoir to openings adjacent said moving web, so that said V-shaped notches supply adhesive across the width of said strip.

7. The apparatus recited in claim 5 wherein a single slot extends from said reservoir to an opening adjacent said moving web, so that the slot supplies adhesive across the width of said strip.

8. The apparatus recited in claim 1 wherein said web of film moves at a speed greater than the speed of extrusion of said channel from molten thermoplastic through said die, so that the dimensions of the channel strip deposited on said moving web are smaller than the dimensions of said channel profile extrusion die.

9. The apparatus recited in claim 8 wherein the opening in said channel profile extrusion die is about two to about four times the dimension of said channel shaped strip.

10. The apparatus recited in claim 1 wherein said channel profile extrusion die comprises;
- a channel die block having rib forming grooves cut into one surface of said shaping block and a groove cut into said one surface connecting said notches, said notches and said groove forming a channel profile; and
- a flat block with a flat surface facing said one surface of said shaping block to close the open side of said channel profile extrusion die.

11. The apparatus recited in claim 10 wherein said means for applying adhesive comprises an adhesive shaping block having in one surface thereof an adhesive reservoir and a plurality of V-shaped notches between said reservoir and the edge of said adhesive shaping block so that adhesive flows from said reservoir through said notches into the width of said strip between the ribs thereof, said one surface of said adhesive shaping block being positioned against a flat surface of said channel die block which is orthoganal to said one surface and in the direction of movement of said web.

12. The apparatus recited in claim 10 wherein said means for applying adhesive comprises an adhesive shaping block having in one surface thereof an adhesive reservoir and a single slot between said reservoir and the edge of said adhesive shaping block so that adhesive flows from said reservoir through said slot into the width of said strip between the ribs thereof, said one surface of said adhesive shaping block being positioned against a flat surface of said channel die block which is orthoganal to said one surface and in the direction of movement of said web.

13. The apparatus recited in claim 10 further comprising:
- a feed block, said channel die block being positioned against said feed block, said feed block having a conduit connecting said channel profile extrusion die with said means for supplying molten thermoplastic.

14. The apparatus recited in claim 11 or 12 further comprising:
- a manifold assembly comprising a plurality of coextruding assemblies wherein the feed block for each coextruding assembly is part of a manifold unit for supplying adhesive and thermoplastic to each of said shaping portions.

15. The apparatus recited in claim 1 further comprising:
- a plurality of said coextruding assemblies and a manifold unit supplying molten thermoplastic and adhesive to the shaping portion of each coextruding assembly.

16. The apparatus recited in claim 15 wherein said manifold unit comprises a bore through which molten thermoplastic is supplied to said channel profile extrusion die.

17. The apparatus recited in claim 16 further comprising:
- a metering screw for each channel profile extrusion die in said manifold assembly for regulating the flow of molten thermoplastic from said bore into said dies.

18. The apparatus recited in claim 15 wherein said manifold unit has means for recirculating adhesive past bores which supply said adhesive to each of said adhesive shaping blocks.

19. The apparatus recited in claim 18 wherein said means for recirculating adhesive comprises a feed bore, a return bore, and a channel for connecting the terminal end of said feed bore to the starting end of said return bore.

20. The apparatus recited in claim 18 further comprising:
- a metering screw for each of said adhesive shaping block to control the flow of adhesive to said adhesive shaping blocks.

21. The apparatus recited in claim 1 wherein said means for supplying adhesive is a hot melt adhesive applicator pump.

22. The apparatus recited in claim 1 wherein said means for supplying molten thermoplastic is a polymer pump.

23. The apparatus recited in claim 22 wherein said polymer comprises polyethylene and wherein said moving web of film comprises polyethylene.

24. Apparatus for attaching a channel shaped adhesive strip having ribs along each side and an adhesive layer between said ribs to a plastic film comprising:
- means for moving a web of said film;
- a coextruding assembly positioned adjacent to said moving web having:
  - a channel profile extrusion die;

means for supplying molten thermoplastic to said die to extrude a channel shaped strip of thermoplastic having ribs along each side which is deposited on said moving web;

means for applying a layer of adhesive across the width of said strip between the ribs thereof;

means for supplying molten adhesive to said applicator means; and means for maintaining said moving web of film under tension so that contraction of the film upon release compensates for the contraction of said channel shaped strip as it cools to prevent puckering of said moving web.

25. A method of attaching a channel shaped adhesive strip having ribs along each side and an adhesive layer between said ribs to a plastic film comprising:

moving a web of said film past a coextruding assembly;

extruding a channel shaped strip of thermoplastic onto said moving web;

applying a layer of adhesive between the ribs of said strip; and maintaining a temperature differential between said molten thermoplastic and said moving web so that said extruded thermoplastic channel strip adheres to said moving web upon contact and thereafter cools to set said extruded thermoplastic channel strip in said channel profile with said adhesive between the ribs of said strip.

26. The method recited in claim 25 wherein the step of maintaining a temperature differential includes:

heating said molten thermoplastic to a first temperature;

heating a backup roller over which said web of film moves to a second temperature; and maintaining said first temperature of said molten thermoplastic higher than said second temperature of said backup roller.

27. The method recited in claim 26 further comprising:

maintaining said moving web of film under tension so that upon release contraction of the film compensates for the contraction of said channel shaped strip as it cools to prevent puckering of said moving web.

28. The method recited in claim 25 further comprising:

applying said adhesive under pressure across the width of said strip.

29. The method recited in claim 25 further comprising:

extruding a channel shaped thermoplastic strip having dimensions larger than the desired final dimensions; and moving said web of film at a speed greater than the speed extrusion of said molten thermoplastic to draw said channel strip down to the desired final dimensions.

30. The method recited in claim 25 performed with a plurality of said coextruding assemblies; and supplying molten thermoplastic and adhesive through a manifold unit to said coextruding assemblies.

31. The method recited in claim 30 further comprising:

recirculating adhesive in said manifold.

32. A method of attaching a channel shaped adhesive strip having ribs along each side and an adhesive layer between said ribs to a plastic film comprising:

moving a web of said film past a coextruding assembly;

extruding a channel shaped strip of thermoplastic onto said moving web;

applying a layer of adhesive between the ribs of said strip; and tensioning said moving web of film as it passes said coextruding assembly so that contraction of the film upon release compensates for the contraction of said channel shaped strip as it cools to prevent puckering of said moving web.

* * * * *